(12) United States Patent
Qadeer et al.

(10) Patent No.: US 7,752,605 B2
(45) Date of Patent: Jul. 6, 2010

(54) PRECISE DATA-RACE DETECTION USING LOCKSETS

(75) Inventors: Shaz Qadeer, Seattle, WA (US); Tayfun Elmas, Sariyer (TR)

(73) Assignee: Microsoft Corporation, Redmond, WA (US)

( * ) Notice: Subject to any disclaimer, the term of this patent is extended or adjusted under 35 U.S.C. 154(b) by 1029 days.

(21) Appl. No.: 11/403,414

(22) Filed: Apr. 12, 2006

(65) Prior Publication Data

US 2007/0245312 A1 Oct. 18, 2007

(51) Int. Cl.
*G06F 9/44* (2006.01)
(52) U.S. Cl. ...................... 717/127; 717/124
(58) Field of Classification Search ........................ None
See application file for complete search history.

(56) References Cited

OTHER PUBLICATIONS

Eli Pozniansky and Assaf Schuster, "Efficient On-the-Fly Data Race Detection in Multithreaded C++ Programs", Oct. 2003, ACM SIGPLAN Notices, vol. 38, Issue 10, pp. 179-190.*
Yuan Yu, Thomas L. Rdeheffer and Wei Chen, "RaceTrack: Efficient Detection of Data Race Conditions via Adaptive Tracking", Apr. 2005, Microsoft Technical Report.*
Richard Carver and Kuo Chung Tai, "Modern Multithreading", Oct. 2005, John Wiley and Sons, pp. 143-149.*
C. Praun and T. Gross. Object Race Detection. In Proceedings of the 16th ACM SIGPLAN Conference on Object Oriented Programming, Systems, Languages, and Applications (OOPSLA), pp. 70-82, 2001.
E. Schonberg. On-the-Fly Detection of Access Anomalies. In Proceedings of the ACM SIGPLAN Conference on Programming Language Design and Implementation (PLDI), pp. 285-297, 1989.
Flanagan, C. and Godefroid, P. Dynamic Partial-Order Reduction for Model Checking Software. In Proceedings of the $32^{nd}$ ACM SIGNPLAN-SIGACT Symposium on Principles of Programming Languages. POPL'05. ACM Press, New York, NY, 12 pages.
F. Mattern. Virtual Time and Global States of Distributed Systems. Proc. Workshop on Parallel and Distributed Algorithms, pp. 120-131, 1989.
L. Lamport. Time, Clocks, and the Ordering of Events in a Distributed System. Communications of the ACM, 21(7), pp. 558-565, 1978.
M. Christiaens and K. De Bosschere. TRaDe, a Topological Approach to On-the-Fly Race Detection in Java Programs. In Proceedings of the Java Virtual Machine Research and Technology Symposium (JVM), 2001.
Savage et al., Eraser: A Dynamic Data Race Detector for Multi-Threaded Programs. In ACM Transactions on Computer Systems, pp. 391-411, 1997.

* cited by examiner

*Primary Examiner*—Wei Y Zhen
*Assistant Examiner*—Lanny Ung
(74) *Attorney, Agent, or Firm*—Klarquist Sparkman, LLP

(57) ABSTRACT

A data race detection system is described which precisely identifies data races in concurrent programs. The system and techniques described utilize locksets to maintain information while searching through executions of a concurrent program. The locksets are updated according to program statements in the concurrent program. The dynamic updating of the locksets, combined with a less conservative approach then used in existing lockset data race detection techniques, allows the technique to be precise; that is, the technique does not report false positives when searching a program.

17 Claims, 13 Drawing Sheets

Runtime Structures Maintained by Model Checker 400

Fig. 3

(ALLOCATE)
$$\frac{\alpha = (x = new) \quad h(a) = \bot}{(\ell s, h) \xrightarrow{\alpha}_t (\ell s[t := \langle pc', l[x := a]\rangle], h[a := \lambda_I])}$$

(READHEAP)
$$\frac{\alpha = (y = x.f) \quad h(l(x)) \neq \bot}{(\ell s, h) \xrightarrow{\alpha}_t (\ell s[t := \langle pc', l[y := h(l(x), f)]\rangle], h)}$$

(READHEAP FAIL)
$$\frac{\alpha = (y = x.f) \quad h(l(x)) = \bot}{(\ell s, h) \xrightarrow{\alpha}_t (\ell s[t := \langle wrong, l\rangle], h)}$$

(WRITEHEAP)
$$\frac{\alpha = (x.f = y) \quad h(l(x)) \neq \bot}{(\ell s, h) \xrightarrow{\alpha}_t (\ell s[t := \langle pc', l\rangle], h[(l(x), f) := l(y)])}$$

(WRITEHEAP FAIL)
$$\frac{\alpha = (x.f = y, pc') \quad h(l(x)) = \bot}{(\ell s, h) \xrightarrow{\alpha}_t (\ell s[t := \langle wrong, l\rangle], h)}$$

(OPERATION)
$$\frac{\alpha = (x = op(y_1, \ldots, y_m))}{(\ell s, h) \xrightarrow{\alpha}_t (\ell s[t := \langle pc', l[x := op(l(y_1), \ldots, l(y_m))]\rangle], h)}$$

(ACQUIRE)
$$\frac{\alpha = acq(x) \quad h(l(x), owner) = 0}{(\ell s, h) \xrightarrow{\alpha}_t (\ell s[t := \langle pc', l\rangle], h[(l(x), owner) := t])}$$

(ACQUIRE FAIL)
$$\frac{\alpha = acq(x) \quad h(l(x)) = \bot}{(\ell s, h) \xrightarrow{\alpha}_t (\ell s[t := \langle wrong, l\rangle], h)}$$

(RELEASE)
$$\frac{\alpha = rel(x) \quad h(l(x), owner) = t}{(\ell s, h) \xrightarrow{\alpha}_t (\ell s[t := \langle pc', l\rangle], h[(l(x), owner) := 0])}$$

(RELEASE FAIL)
$$\frac{\alpha = rel(x) \quad (h(l(x)) = \bot \vee h(l(x), owner) \neq t)}{(\ell s, h) \xrightarrow{\alpha}_t (\ell s[t := \langle wrong, l\rangle], h)}$$

(FORK)
$$\frac{\alpha = (x = fork) \quad \ell s(u) = \bot}{(\ell s, h) \xrightarrow{\alpha}_t (\ell s[t := \langle pc', l\rangle][u := \langle pc_I, l\rangle], h)}$$

(JOIN)
$$\frac{\alpha = join(x) \quad \ell s(l(x)) = \langle end, l'\rangle}{(\ell s, h) \xrightarrow{\alpha}_t (\ell s[t := \langle pc', l\rangle], h)}$$

Formalization Transition Relation Examples

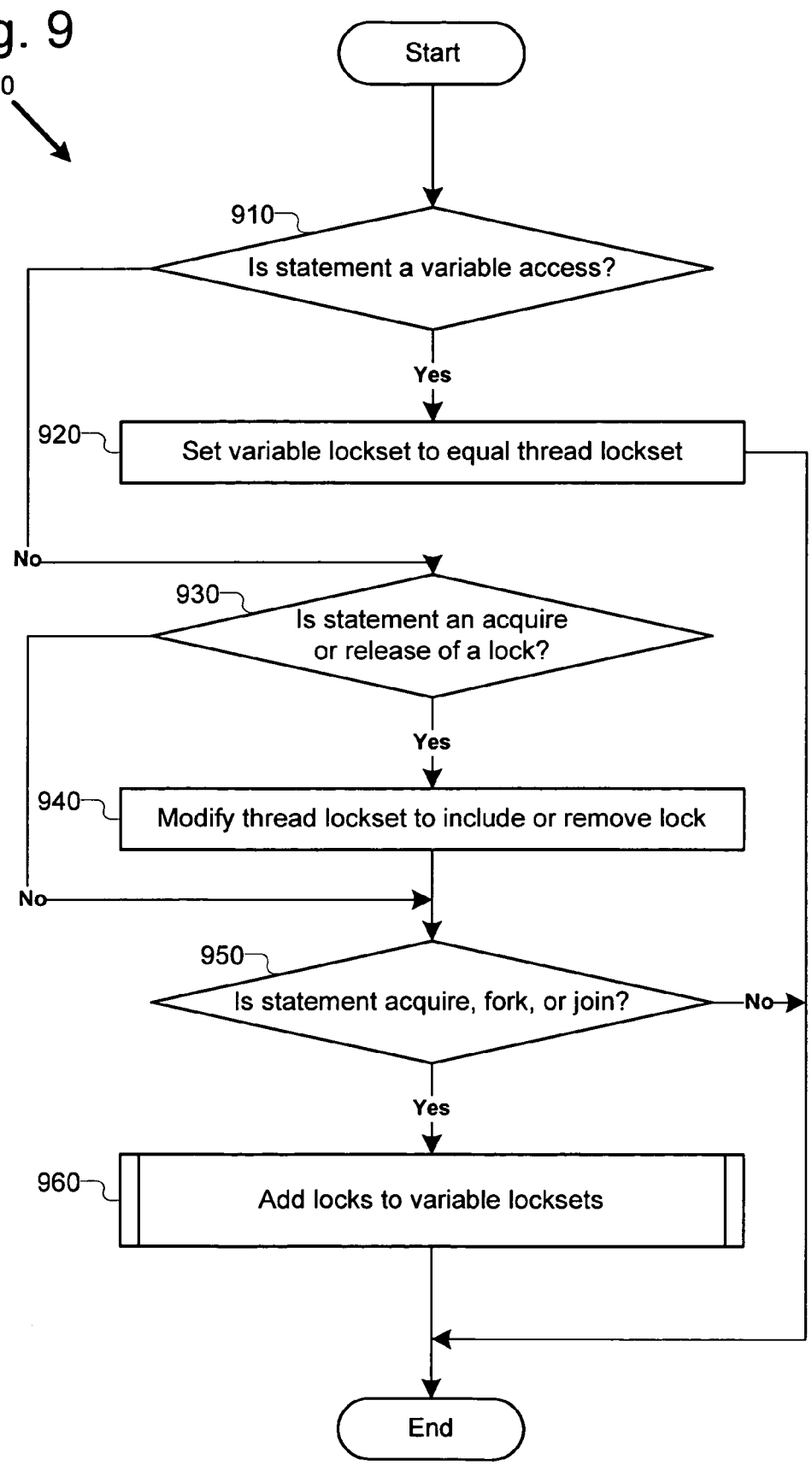

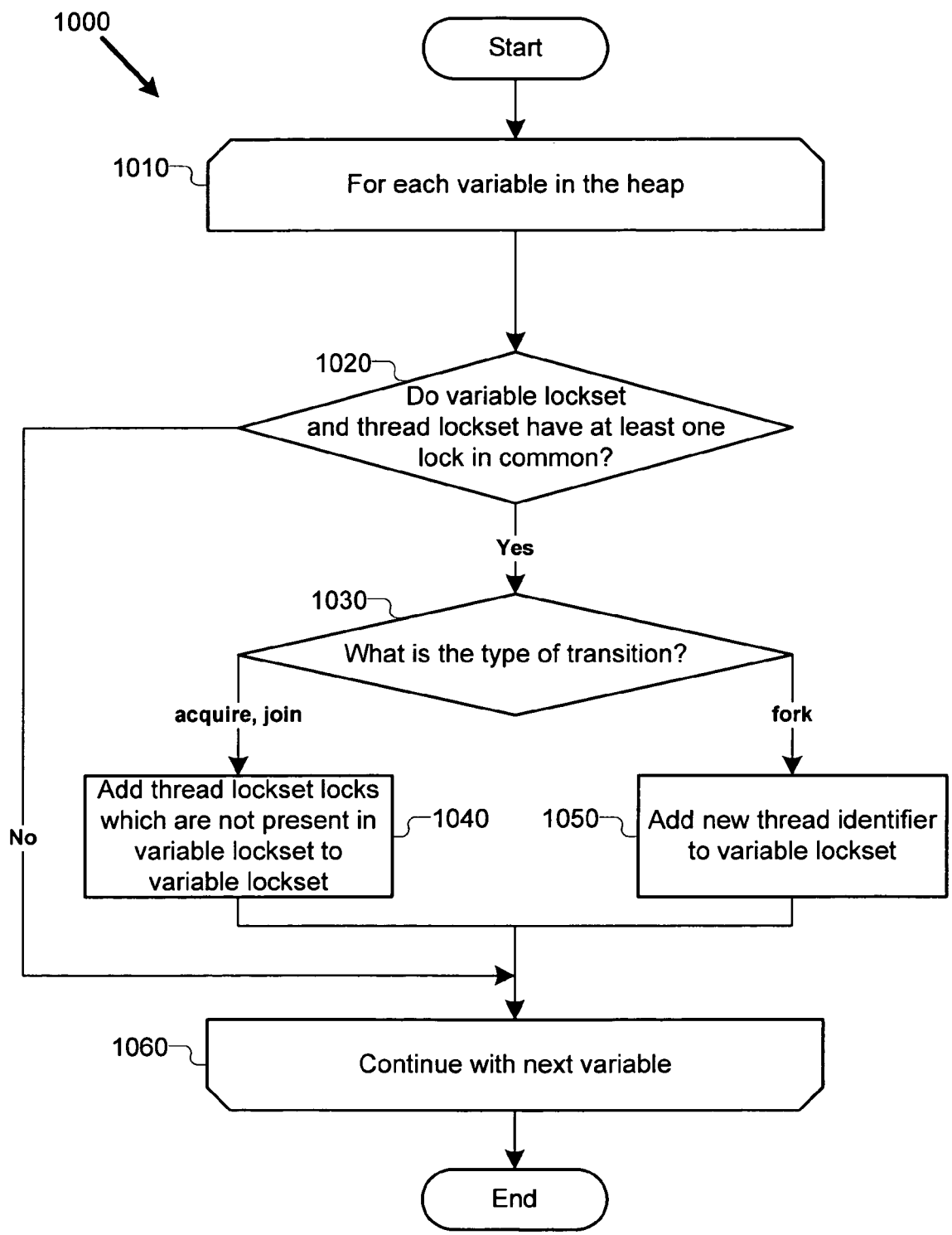

Fig. 11

```
Search() {
1    Node curr = new Node;
2    curr.state = (ℓs₁, h₁);
3    curr.LS = λq ∈ HeapVariable. Addr ∪ Tid;
4    curr.la = λq ∈ HeapVariable. null;
5    curr.tid = 0;
6    curr.done = ∅;

7    Stack⟨Node⟩ stack = new Stack⟨Node⟩;
8    stack.Push(curr);

9        (Addr ∪ Tid) → (Addr ∪ Tid) f;
10       curr.f = Canonize(curr.state);
11       table(curr.f(curr.state)) = curr.f(curr.LS);
12       curr.races = ∅;
13       rtable(s) = ∅;
14       curr.va = ∅;
15       curr.succOnStack = false;

16   while (¬stack.IsEmpty()) {
17       Tid t;
18       curr = stack.Peek();
19       if (curr.tid = 0 ∧ done ⊂ enabled(curr.state))
20           t = choose(enabled(curr.state) \ curr.done);
21       elsif (curr.tid ≠ 0 ∧ curr.tid ∉ curr.done)
22           t = curr.tid;
23       else {
24           stack.Pop();

25           if (curr.tid = 0 ∧ curr.succOnStack) {
26               foreach (HeapVariable q'. curr.la(q') ≠ null) {
27                   curr.la(q').tid = 0;
28                   curr.races = HeapVariable;
29               }
30               rtable(curr.f(curr.state)) = curr.f(curr.races);
31               Node prev = stack.Peek();
32               prev.races = prev.races ∪ (curr.races \ curr.va);

33           continue;
34       }
```

1100 →

```
35       curr.done = curr.done ∪ {t};
36       curr.tid = t;
37       Node next = Successor(curr, t);

38       ((Addr ∪ Tid) → (Addr ∪ Tid)) f = next.f;
39       State s = f(next.state);
40       if (table(s) exists) {
41           (HeapVariable → (Addr ∪ Tid)) locksets;
42           locksets = f⁻¹(table(s));
43           if (locksets ⊆ next.LS) {
44               if (∃n ∈ stack. s = n.f(n.state)) {
45                   curr.tid = 0;
46                   curr.succOnStack = true;
47               }
48               continue;
49           }
50           next.LS = locksets ∩ next.LS;
51       }
52       table(s) = f(next.LS);

53       stack.Push(next);
54   }
55 }
```

1100 →

```
record Node {
1    State state;
2    (HeapVariable → Powerset(Tid ∪ Addr)) LS;
3    (HeapVariable → Node) la;
4    (Tid ∪ {0}) tid;
5    Powerset(Tid) done;

6    ((Addr ∪ Tid) → (Addr ∪ Tid)) f;
7    Powerset(HeapVariable) races;
8    Powerset(HeapVariable) va;
9    boolean succOnStack;

(State → HeapVariable → (Addr ∪ Tid)) table;
     (State → Powerset(HeapVariable)) rtable;
10 }
```

```
Node Successor(Node curr, Tid t) {
1  Heap h, h';
2  LocalStates ℓs, ℓs';
3  Action α;
4  (h, ℓs) = curr.state;
5  let (h, ℓs) →ᵅₜ (h', ℓs');
6  Node next = new Node;
7  next.state = (h', ℓs');
8  next.LS = Update(curr.LS, (h, ℓs) →ᵅₜ (h', ℓs'));
9  next.la = curr.la;
10 next.f = Canonize(next.state);
11 next.races = ∅;
12 next.va = ∅;

13 switch (α) {
14   case y = x.f :
15   case x.f = y :
16     HeapVariable q = (ℓs(t)(x), f);
17     next.va = {q};
18     next.la(q) = curr;
19     if (curr.LS(q) ∩ LH(curr.state, t) = ∅) {
20       curr.la(q).tid = 0;

21       curr.races = curr.races ∪ {q};

22     }

23   case acq(x) :
24   case join(x) :
25     curr.tid = 0;
26 }

27     ((Addr ∪ Tid) → (Addr ∪ Tid)) f = next.f;
28     State s = f(next.state);
29     if (rtable(s) exists) {
30       next.races = f⁻¹(rtable(s));
31       foreach (HeapVariable q' ∈ next.races)
32         next.la(q').tid = 0;
33       curr.races = curr.races ∪ (next.races \ next.va);
34     }

35 next.tid = (t ∈ enabled(next.state)) ? t : 0;
36 next.done = ∅;
37 next.succOnStack = false;
38 return next;
39}
```

Software 1380 Implementing Data Race
Detection Techniques

PRECISE DATA-RACE DETECTION USING LOCKSETS

BACKGROUND

Concurrent programs, also known as multithreaded programs, are found in a wide array of products and services, from software device management to distributed scientific computing. However, the fundamental nature of these programs, the fact that they contain multiple concurrently-executing threads, can cause inter-thread conflicts which can create errors or hanging conditions upon execution. These errors can be particularly difficult to discover when programming because oftentimes more than one asynchronously-running thread is run on a single processor. The instructions of the threads are interleaved, giving rise to a potentially large number of different executions. Because of this, an important, and difficult, part of the debugging and analysis of a concurrent program involves finding potential conflicts between threads.

One of these conflicts is known as a data race. Generally, a data race is a condition where there exists an execution of two or more threads such that the executing computer can arrive at a state for which a) there are two threads which can execute, b) both of these threads access a common variable, and c) at least one of the accesses is a write access.

FIGS. 1a, 1b, 2a, and 2b illustrate two types of data race conditions which can lead to unpredictable results. Avoiding these unpredictable results is the goal of the program analysis discussed below. FIGS. 1a and 1b illustrate one type of data race, that of conflicting read and write instructions from two different threads. In both Figures, there are two concurrently-executing threads which access a common variable, referred to here as "a," which starts with value 0. The Figures illustrate two different executions of the instructions of Threads 1 and 2. A data race occurs in this example when a computer executing these threads reaches a state at which either of the two executions illustrated could execute. Other than the differing orders, described below, the variable accesses in the Figures are the same In FIG. 1a, Thread 1, which contains the assignment instruction "q=a," reads the value of a as 0 and then assigns that value to the variable q. After this point in time, Thread 2 then executes the instruction "a=1" which assigns the value 1 to a. Thus, at the end of the execution of FIG. 1a, a has the value 1 and q has the value 0. In contrast, FIG. 1b illustrates a different execution in which Thread 2 writes to variable a before Thread 1 reads from it. In this case, because a is assigned a value by Thread 2 before Thread 1 is able to read a, q ends up with the value 1. Thus, the two executions illustrated in FIGS. 1a and 1b give two different results for q.

FIGS. 2a and 2b illustrate another type of data race, that of conflicting write instructions. As in FIGS. 1a and 1b, FIGS. 2a and 2b illustrate different executions of instructions from two concurrently-executing threads. In FIG. 2a, Thread 1 executes the instruction "a=0" before Thread 2 executes "a=1," which results in a having the final value of 1. In contrast, FIG. 2b illustrates the two write commands executing in a differing order, giving α a final value of 0.

The illustrated examples of FIGS. 1a, 1b, 2a, and 2b demonstrate that executions of concurrently-executing threads can cause different values to be placed in certain variables, which can cause a program to behave unpredictably or to fail to execute. Oftentimes, these errors are solved by forcing the competing threads to execute synchronously, which means forcing the threads to operate under a common timing or locking mechanism. The use of synchronous threads allows a programmer to decide ahead of time that certain instructions cannot interfere with each other and to make allowances for that by modifying the programming. However, in order to utilize synchronicity, data races such as those illustrated in FIGS. 1a-1d must be located.

Because data races are so timing-dependent, and may occur under only certain conditions, searching for them in a program can be a difficult, time-consuming process. Data race detection techniques are described with reference to their soundness and preciseness. As used in this application, techniques and systems which are sound are do not fail to miss data races for executions which the techniques investigate. By contrast, the term precise, as used in this application, denotes those techniques which do not generate false positives. That is, techniques that are not precise may report false errors by identifying data races from interleavings of instructions that cannot or will not happen. A precise technique, however, will only report a data race when once truly exists. This means that a data race detection technique that is sound and precise will indicate a data race in a program if, and only if, a data race exists for some execution of the program. What is needed is a sound system for precisely detecting data races in concurrent programs.

SUMMARY

Dynamic model checking techniques and systems which detect data races in concurrent programs are described. In various implementations, the following features are utilized, either separately or in combination. Examples of the systems and techniques described herein utilize locksets to maintain and analyze information about protected and accessible variables in a concurrent program. A model checker is described which, given a model of a concurrent program, searches through executions of the program. A data race detection module is described which can be used by the model checker to generate and update locksets which hold information about locks held by threads and locks which are thought to provide protection for variables. Updates to the locksets are described which are performed for program statements as the executions are searched. A technique for comparing locksets at memory accesses is described which, in one implementation, precisely identifies data races which exist for an execution. Alternatively, the data race detection module can be used separately to check for data races in a context outside of model checking.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be made apparent from the following detailed description of embodiments that proceeds with reference to the accompanying drawings.

BRIEF DESCRIPTION OF THE DRAWINGS

FIG. 3 is a list of examples of transition relations for a formalization of a concurrent program.

FIG. 9 is a flowchart illustrating a further example process performed by the model checker compiler of FIG. 4 for updating locksets.

FIG. 10 is a flowchart illustrating another example process performed by the model checker compiler of FIG. 4 for updating locksets.

FIG. 11 illustrates pseudocode listings illustrating example implementations of the data race detection techniques described herein.

FIG. 12 illustrates a pseudocode listing illustrating an example implementation of the data race detection techniques described herein.

DETAILED DESCRIPTION

Figure 1A:
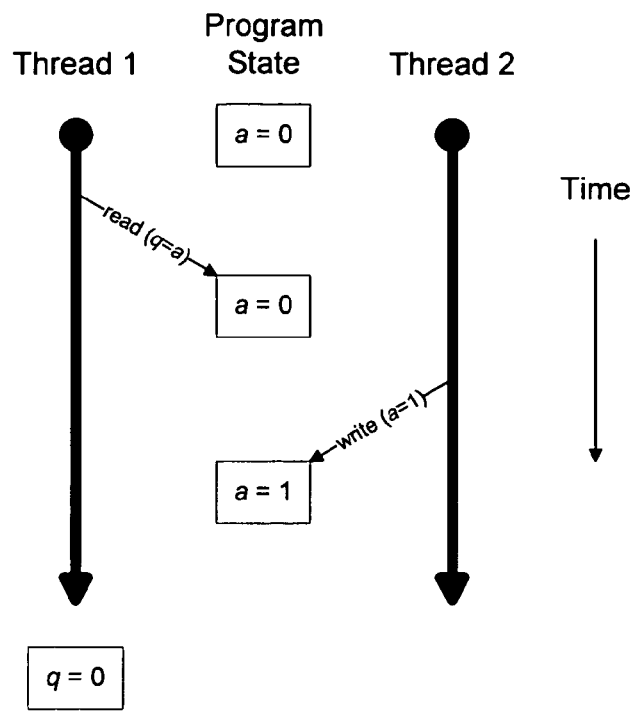
FIGS. 1a and 1b are a block diagrams illustrating one example of a data race in a concurrent program.
Figure 1B:
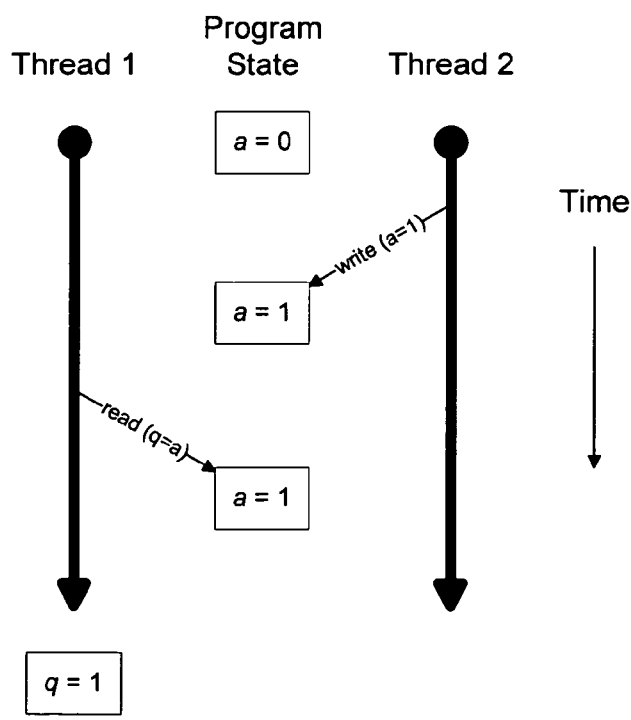
Figure 2A:
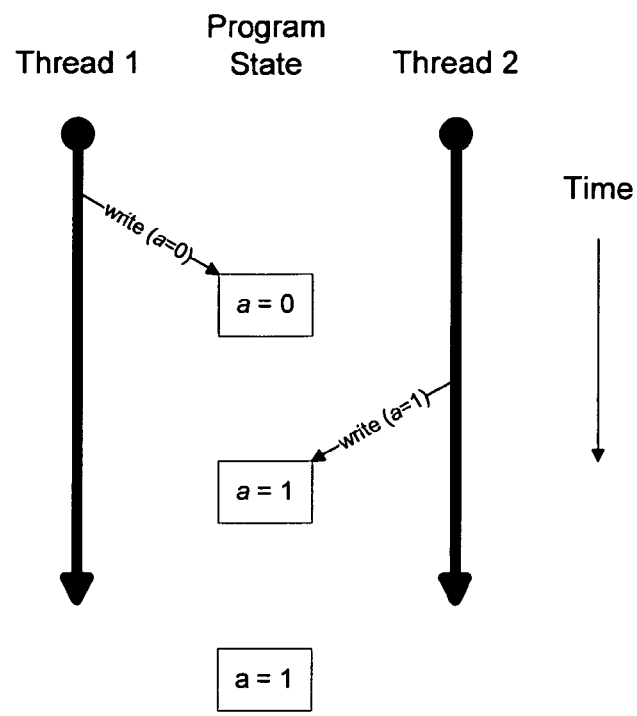
FIGS. 2a and 2b are a block diagrams illustrating another example of a data race in a concurrent program.
Figure 2B:
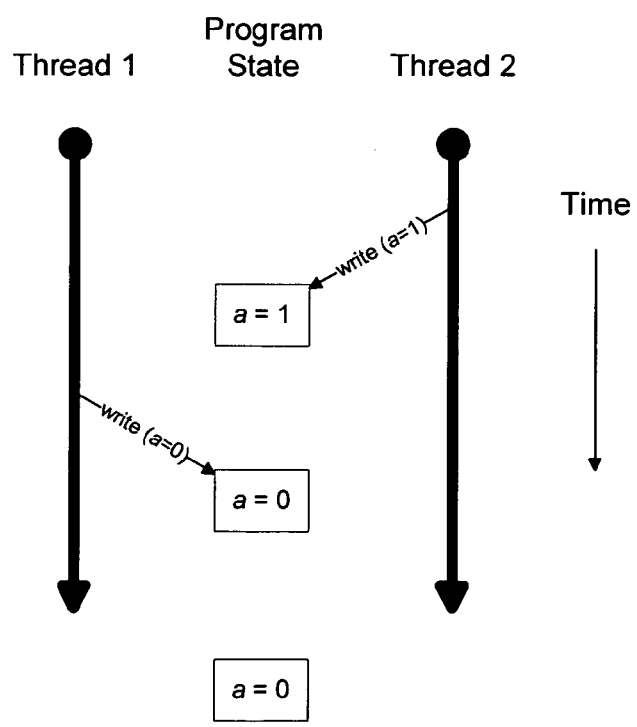

1. Examples of Existing Data Race Detection Techniques

Existing data race detection techniques fall in to two categories vector-clock based techniques and lockset-based techniques. Vector-clock based race detection algorithms are precise but, when a race is detected, they fail to provide easy-to-interpret information for understanding and fixing the race condition. Moreover, these algorithms can not be naturally used as the basis for flow-sensitive static analyses, such as stateful model checking.

Lockset-based race-detection algorithms are more intuitive and capture directly the locking discipline employed by the programmer, but existing lockset algorithms have other shortcomings. Oftentimes, these algorithms are specific to a particular locking discipline. For instance, the classic lockset algorithm popularized by the Eraser tool is based on the assumption that each potentially shared variable must be protected by a single lock throughout the whole computation. For many realistic programs this assumption is false and leads to the reporting of a false race. Other similar algorithms can handle more sophisticated locking mechanisms by incorporating knowledge of these mechanisms into the lockset inference rules. They may still report false races when the particular locking discipline they are tracking is violated.

Herein are described two examples of existing lockset algorithms which are not precise. In the following, s denotes a program state reached during an execution of the program, q denotes a shared variable, and t denotes a thread. $LH_s(t)$ is the set of locks held by t at s, and $LH_s^{tech}(q)$ is the set of locks that technique tech believes protect access to q. Generally, lockset-based race-detection algorithms declare the existence of a race condition when $LH_s(t) \cap LH_s^{tech}(q)$ is empty. A major difference between the different techniques is in how they differ in computation and updating of locksets, i.e., how they compute $LH_s^{tech}(q)$ at various program points. These differences in turn lead to differences of precision, as mentioned above.

Generally, existing lockset algorithms are too conservative in how they update $LS^{tech}$ during an execution. For instance, the standard lockset technique (denoted by std) is based on the assumption that each shared variable is protected by a fixed unique lock throughout the execution. It attempts to infer this lock by setting $LS^{std}(q)$ to the intersection $LH(t) \cap LS^{std}(q)$ at each access to q by thread t. If this intersection becomes empty, the technique reports a race. Clearly, std is too conservative since it reports a false race if the lock protecting a variable changes over time. Once example illustrating this scenario is given below:

| T1      | T2      | T3      |
|---------|---------|---------|
| acq(m1) | acq(m2) | acq(m1) |
| acq(m2) | acq(m3) | acq(m3) |
| x++     | x++     | x++     |
| rel(m1) | rel(m2) | rel(m1) |
| rel(m2) | rel(m3) | rel(m3) |

The code executed by each thread Ti is listed underneath the heading Ti. In the interleaving in which all actions of T1 are completed followed by all actions of T2 followed by all actions of T3, when T3 accesses x, the standard algorithm declares a race since $LS^{std}(x) = m2$ before this access and T3 does not hold m2.

A less conservative alternative, denoted by technique lsa, is to set $LS^{lsa}(q)$ to LH(t) after a race-free access to q by a thread t. This choice results in a less pessimistic sufficient condition but is still too conservative. In the example above, T3 will not report a race, but it will report a false race in the example below.

```
Class IntBox{
    Int x;
}
IntBox a = new IntBox; // IntBox object o1 created
IntBox b = new IntBox; // IntBox object o2 created
Lock ma, mb;
```

| T1       | T2       | T3      |
|----------|----------|---------|
| acq(ma); | acq(ma); | acq(mb) |
| a.x++;   | acq(mb); | b.x++;  |
| rel(ma); | tmp = a; | rel(mb) |
|          | a = b;   |         |
|          | b = tmp; |         |
|          | rel(ma); |         |
|          | rel(mb); |         |

Consider again the interleaving in which all actions of T1 are completed, followed by those of T2 and T3 as above. T2 swaps the objects referred to by variables a and b, so that during T3's actions, b refers to o1. o1.x is initially protected by ma but is protected by mb after T2's actions. lsa is unable to infer the correct new lock for o1.x since T2 makes no direct access to o1.x and $LS^{lsa}(o1.x)$ is not modified by T2's actions.

The techniques described herein utilize lockset update rules which allow LS(q) to grow and change during the execution. In this way, the techniques are able avoid false alarms.

2. Examples of Formalization

The examples of this section comprise one implementation of a formalization of a concurrent program which is used below in order to better clarify the operation of the data race detection techniques described herein. In alternative implementations, different formalizations may be used. A concurrent program consists of a set of threads, each of which executes a sequence of operations. These operations include local computation involving thread-local variables, reading and writing shared variables on the heap, and synchronization operations such as acquiring and releasing mutex locks, forking a thread, and joining with a thread. We give more details below.

A state of a program is a pair (ls, h). The partial function $l_s$: Tid→LocalState maps a thread identifier t to the local state of thread t. The set Tid is the set of thread identifiers. The local state $l_s(t)$ is a pair $\langle pc, l \rangle$ consisting of the control location pc and a valuation l to the local variables of thread t. The heap h is a collection of cells each of which has a unique address and contains a finite set of fields. The set Addr is the set of heap addresses. Formally, the heap h is a partial function mapping addresses to a function that maps fields to values. Given address a ∈ Addr and field f ∈ Field, the value stored in the field f of a cell with address a is denoted by h(a,f). The pair (a,f) is called a heap variable of the program. Heap variables are shared among the threads of the program, and thus, operations on these are visible to all threads. It is on these variables that data races can occur. Each local variable or field of a cell may contain values from the set Tid∪Addr∪Integer.

An action α ∈ Actions is an operation that is guaranteed to be performed atomically by the executing thread. The action x=new allocates a new object on the heap and stores its address in the local variable x. The action y=x.f reads into y the value contained in the f field of the object whose address is in x. If x does not contain the address of a heap object, this action goes wrong. Similarly, the action x.f=y stores a value into a field of a heap object. The action $x=op(y_1, \ldots y_n)$ models local computation where $op(y_1, \ldots y_n)$ is either an arithmetic or boolean function over the local variables $y_1, \ldots, y_n$.

Every object on the heap has a lock associated with it. This lock is modeled using a special field owner that is accessible only by the acq and rel actions. The action acq(x) acquires the lock on the object whose address is contained in x. This action is enabled only if x.owner=0 and it sets x.owner to the identifier of the executing thread. The action rel(x) releases the lock on the object whose address is contained in x by setting x.owner to 0. This action goes wrong if the value of x.owner is different from the identifier of the executing thread.

The action x=fork creates a new thread and stores its identifier into x. The local variables of the child thread are a copy of the local variables of the parent thread. The action join(x) is enabled only if the thread whose identifier is contained in x has terminated.

The behavior of the program is specified by a control flow graph over a set PC of control locations. A labeling function Label: PC→Local Var labels each location with a local variable. The set of control flow edges are specified by two functions Then: PC→Action x (PC∪{end, wrong}) and Else: PC→Action x (PC∪{end, wrong}). Suppose Label(pc)=x, Then(pc)=$(\alpha_1, pc_1)$, and Else(pc)=$(\alpha_2, pc_2)$. When a thread is at the location pc, the next action executed by it depends on the value of x. If the value of x is nonzero, then it executes the action $\alpha_1$ and goes to $pc_1$. If the value of x is zero, then it executes the action $\alpha_2$ and goes to $pc_2$. A thread terminates and cannot perform any more actions if it reaches one of the special locations end or wrong. The location end indicates normal termination and wrong indicates erroneous termination. The control location wrong may be reached, for example, if the threads fails an assertion or if it attempts to access a field of non-address value.

In the formalization, the semantics of the program are defined as a transition relation $$\xrightarrow{\alpha}_t \subseteq \text{State} \times \text{State},$$

where t ∈ Tid is a thread identifier and α ∈ Action is an action. This relation gives the transitions of thread t. Program execution starts with a single thread with identifier $t_1$ ∈ Tid at control location $pc_1$. The initial state of the program is $(ls_1, h_1)$, where $ls_1(t_1)=\langle pc_1, l_1 \rangle$ and undefined elsewhere, and the heap $h_1$ is not defined at any address. The initial local store $l_1$, of thread $t_1$ assigns 0 to each variable. In each step, a nondeterministically chosen thread t executes an action and changes the state according to the transition relation $$\xrightarrow{\alpha}_t.$$

Let (ls, h) be a state such that ls(t)=$\langle pc, l \rangle$ and Label(pc)=z. Let $\langle \alpha, pc' \rangle$=Then(pc) if l(z)≠0 and Else(pc) otherwise. FIG. 3 then gives examples for rules for the relation $$\xrightarrow{\alpha}_t$$

where a case analysis is performed on α. An execution σ of the program is a finite sequence:

$$(ls_1, h_1) \xrightarrow{\alpha_1}_{t_1} (ls_2, h_2) \xrightarrow{\alpha_2}_{t_2} \cdots \xrightarrow{\alpha_{n-1}}_{t_{n-1}} (ls_n, h_n) \xrightarrow{\alpha_n}_{t_n} (ls_{n+1}, h_{n+1})$$

such that $(ls_1, h_1)=(ls_1, h_1)$ and $$(ls_k, h_k) \xrightarrow{\alpha_k}_{t_k} (ls_{k+1}, h_{k+1})$$

for all 1≤k<n.

In this application, we describe our algorithm for checking whether a given execution σ has a data race using the characterization of data races based on the happens-before relation. The formal definition of the happens-before relation, as used in this application, is as follows: Let $$\sigma = (ls_1, h_1) \xrightarrow{\alpha_1}_{t_1} (ls_2, h_2) \xrightarrow{\alpha_2}_{t_2} \cdots \xrightarrow{\alpha_n}_{t_n} (ls_{n+1}, h_{n+1})$$

be an execution of the program. The happens-before relation $$\xrightarrow{hb}$$

for σ is the smallest transitively-closed relation on the set {1, 2, . . . , n} such that for any k and l, we have

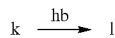

if $1 \leq k \leq l \leq n$ and one of the following holds:
1. $t_k = t_l$.
2. $\alpha_k = \text{rel}(x)$, $\alpha_l = \text{acq}(y)$, and $ls_k(t_k)(x) = ls_l(t_l)(y)$.
3. $\alpha_k = (x = \text{fork})$ and $t_l = ls_{k+1}(t_k)(x)$.
4. $\alpha_l = \text{join}(x)$ and $t_k = ls_l(t_l)(x)$.

The happens-before relation described above can be used to define data-race-free executions as follows. Consider an action $\alpha_k$ in the execution $\theta$ and a heap variable $q = (ls_k(t_k)(x), f)$. The following terminology is used: The thread $t_k$ "reads" q if $\alpha_k = (x = y.f)$. The thread $t_k$ "writes" q if $\alpha_k = (x.f = y)$. The thread "accesses" the variable q if it either reads or writes q. The execution $\theta$ is race free on q if for all $k,l \in [1, n]$ such that $\alpha_k$ and $\alpha_l$ access q, we have

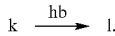

This definition does not distinguish between read and write accesses. However, after the description of the general algorithm below, a refinement is described to make this distinction.

While the Java memory model also defines data race free executions in a similar manner, Java's definition of a happens-before relation also includes all edges between accesses to a volatile variable. Although the formalization above does not include volatile variables, in one implementation their effect on the happens-before relation can be modeled by introducing for each volatile variable q a new lock p and inserting an acquire of p before and a release of p after each access to q.

3. Examples of Precise Data Race Detection Modules and Structures

The examples illustrated herein describe examples of dynamic data race detection systems. In particular, the systems and techniques described herein utilize locksets to maintain and analyze information about protected and accessible variables in a concurrent program. A model checking program takes a model of a concurrent program, and dynamically searches through executions of the program to find data races. As it searches, a data race detection module in the model checker generates and updates locksets which hold information about locks held by threads and locks which are thought to provide protection for variables.

The locksets are updated at program statements as the executions are searched; updates are performed according to the types of program statements reached during the search. At statements which are memory accesses, the data race detection module compares locksets to determine whether a data race exists on a variable being accessed. Due to the nature of the updates on the locksets as the search proceeds, the search is precise, meaning that it identifies a variable as having a data race if and only if a data race exists for that variable in an execution. The preciseness of the techniques described herein avoid the inherent problems of alternative data race detection implementations, which are not guaranteed to identify false positives. Additionally, the data race detection module, by operating on synchronization primitives, such as fork, join, acquire, and release operations, operates without assumptions that the program being analyzed uses any particular synchronization implementation. Thus, the data race detection techniques described herein operate without reference to particular synchronization disciplines and can be utilized with little modification on programs using various synchronization implementations.

Figure 4:
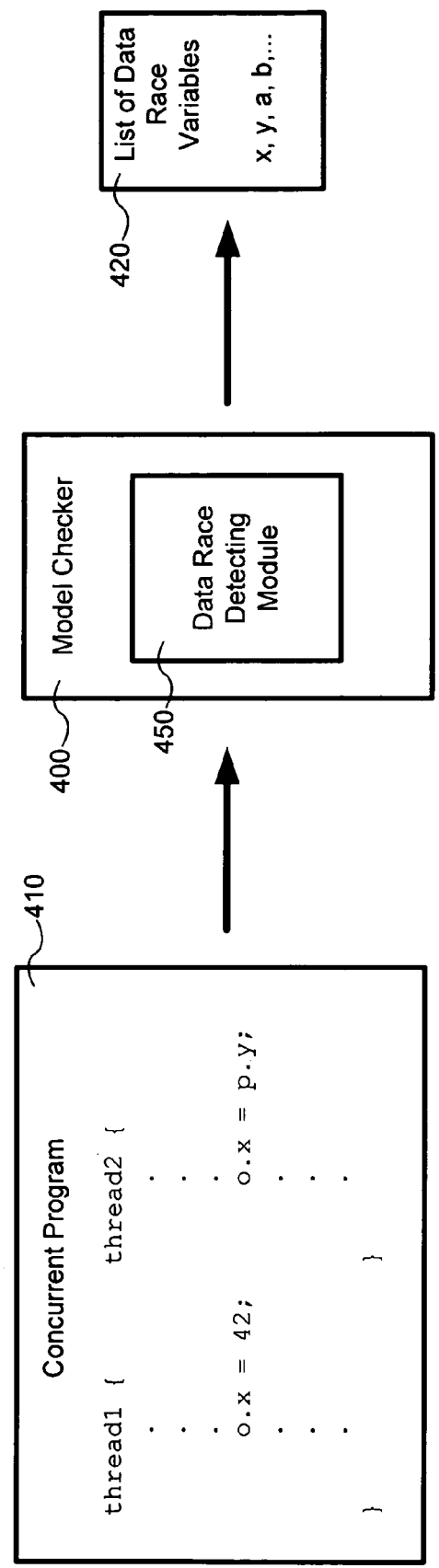
FIG. 4 is a block diagram illustrating an example model checker and data race detection module.

FIG. 4 is a block diagram illustrating a model checker program 400 which utilizes the data race detection techniques described herein to check a concurrent program 410 for data races. As FIG. 4 illustrates, the concurrent program 410 is, in a typical implementation, a program containing multiple execution threads, each of which may perform memory accesses on a shared variable. In the illustrated example, for instance, the concurrent program 410 comprises two threads, each of which performs a write to the location o.x during their execution. This could create a data race on the variable o.x, and thus the model checker serves to locate and identify data races such as this one.

FIG. 4 also illustrates that, in one implementation, the model checker 400 comprises a data race detection module 450, which serves to create locksets and implement lockset maintenance rules according to the techniques described below. Additionally, the data race detection module 450 checks for data races using the information contained in the locksets (e.g. as described above, in one implementation the data race detection module 450 determines when and if $LH(t) \cap LH(q)$ is empty for a given thread t and a variable q). While in one implementation, the model checker serves to search through executions of the concurrent program 410 while the data race detection module performs lockset checking and maintenance, in alternative implementations, a separate data race detection module is not used, and the functions of the module are integrated into the model checker 400. In other implementations, various functions of the data race techniques described herein may be divided or separated into additional software modules. In yet other implementations, the data race detection module 450 can be operated outside of a model checker in order to perform data race detection on a particular execution of a program.

After execution of the model checker, utilizing the data race detection module 450, the model checker 400 produces a list of data race variables 420, which identify those variables for which a data race is known to exist. As described above, because the techniques described herein are both sound and precise, the list of data race variables is, in one implementation, exactly those variables for which a data race exists on some execution of the concurrent program, with no additional false positive variables, and without missing any data race variables. In alternative implementations, the model checker 400 may produce an abridged list of data race variables, possibly because the model checker 400 was configured to not search every possible execution of the concurrent program 410 or because it was configured to report only those data races which meet certain conditions. In another implementation, the list of data race variables may comprise additional information, such as the location of the variables listed, or information identifying traces of executions leading to the listed data races.

Figure 5:
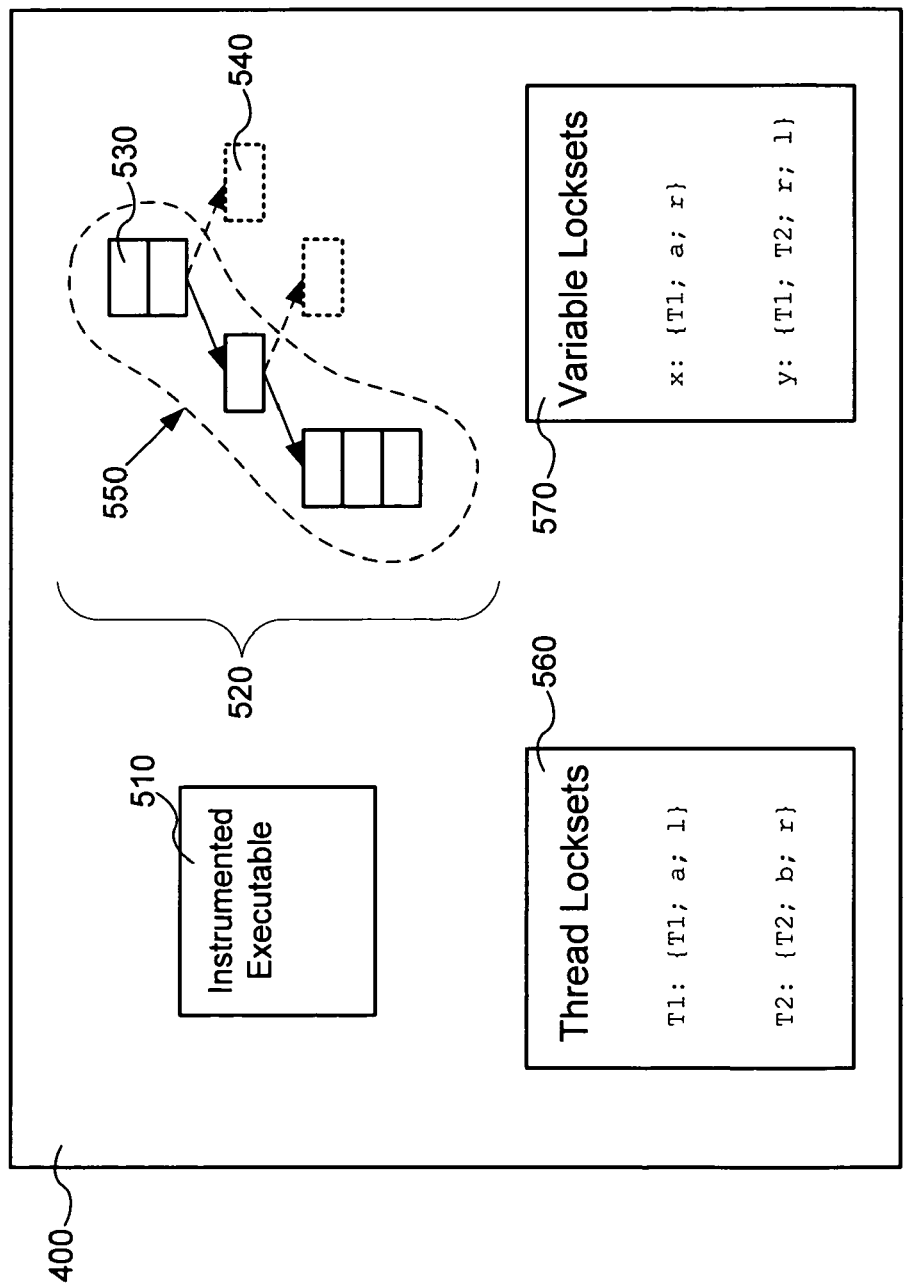
FIG. 5 is a block diagram illustrating examples of runtime structures maintained by the model checker of FIG. 4 during data race detection.

FIG. 5 is a block diagram illustrating, in one implementation, structures which exist at runtime during the operation of the model checker 400 of FIG. 4 for detecting data races in a concurrent program. In the top section of the illustration, an executable version 510 of the concurrent program is shown. In one implementation, this executable version is processed before model checking in order to instrument it for use by the model checker. The instrumentation allows the techniques described herein to easily operate on the concurrent program and obtain program state and control information in order to search through executions of the program. In alternative implementations, different forms of the program may be searched, including intermediate representations such as a control flow graph or source code for the concurrent program.

FIG. 5 also illustrates a search 520 in memory of executions of the concurrent program. The search comprises visited program statements 530, as well as program statements which have not been visited yet 540. In the illustration, a depth-first search of possible executions is being performed, in order to provide as complete a search as possible without overly utilizing memory or computing resources. Thus, in the illustrated example, a particular execution 550 is currently being explored for data race detection.

While the illustrated search mechanism utilizes a depth-first search, in alternative implementations, other search techniques are used. In one implementation, the search mechanism utilized seeks to emulate nondeterministic interleavings of concurrent program statements. Although a particular implementation of the model checking search is described in greater detail below (with reference to FIGS. 11 and 12), a goal of the model checker in one implementation is to systematically and efficiently explore the state space of a concurrent program. A main challenge in systematic exploration is to reduce the number of thread interleavings that need to be explored while maintaining soundness. Partial-order techniques have employed the idea of selective search to achieve such a reduction. In each explored state s, implementations using these techniques attempt to identify a thread t such that the operation of t enabled in s is independent of all operations in any execution from t consisting entirely of operations by threads other than t. If such a thread t is identified, then it suffices to schedule only t in s.

The fundamental problem with these techniques is that, since the executions in the future of s have not been explored, they are forced to make pessimistic guesses about independence. For example, if the operation of thread t is an access of a shared heap variable q, then a pessimistic analysis would declare it to be not independent (or dependent). But if this access by t and any future access by another thread consistently follow the locking discipline associated with q, then these two accesses are separated by the happens-before relation and consequently the access by thread t can be classified as an independent operation. The lockset techniques described herein are able to track the happens-before relation precisely and therefore gives a powerful tool to identify such independent actions.

FIG. 5 also illustrates two examples of sets of locksets which are maintained by the data race detecting module 450 while searching for data races. As described below, in a preferred implementation, the data race detection module 450 maintains a set of thread locksets 560 and a set of variable locksets 470 for the currently-searched execution 550. The thread locksets 560 comprise a lockset for each currently-open thread in the current execution, with each lockset comprising locks held by its corresponding thread. Additionally, in one implementation, each thread lockset contains a thread identifier for the thread itself as a lock. Thus, in the illustrated example, the lockset for thread T1 shows that the thread holds the locks a and l, as well holding the thread's identifier. The variable locksets 570, by contrast, comprise locks which are believed to protect access to the associated variable. Thus, in the illustrated example, the variable x may be protected by the locks a or r, or the thread identifier for thread T1.

4. Examples of Concurrent Program Search and Data Race Detection Techniques

Figure 6:
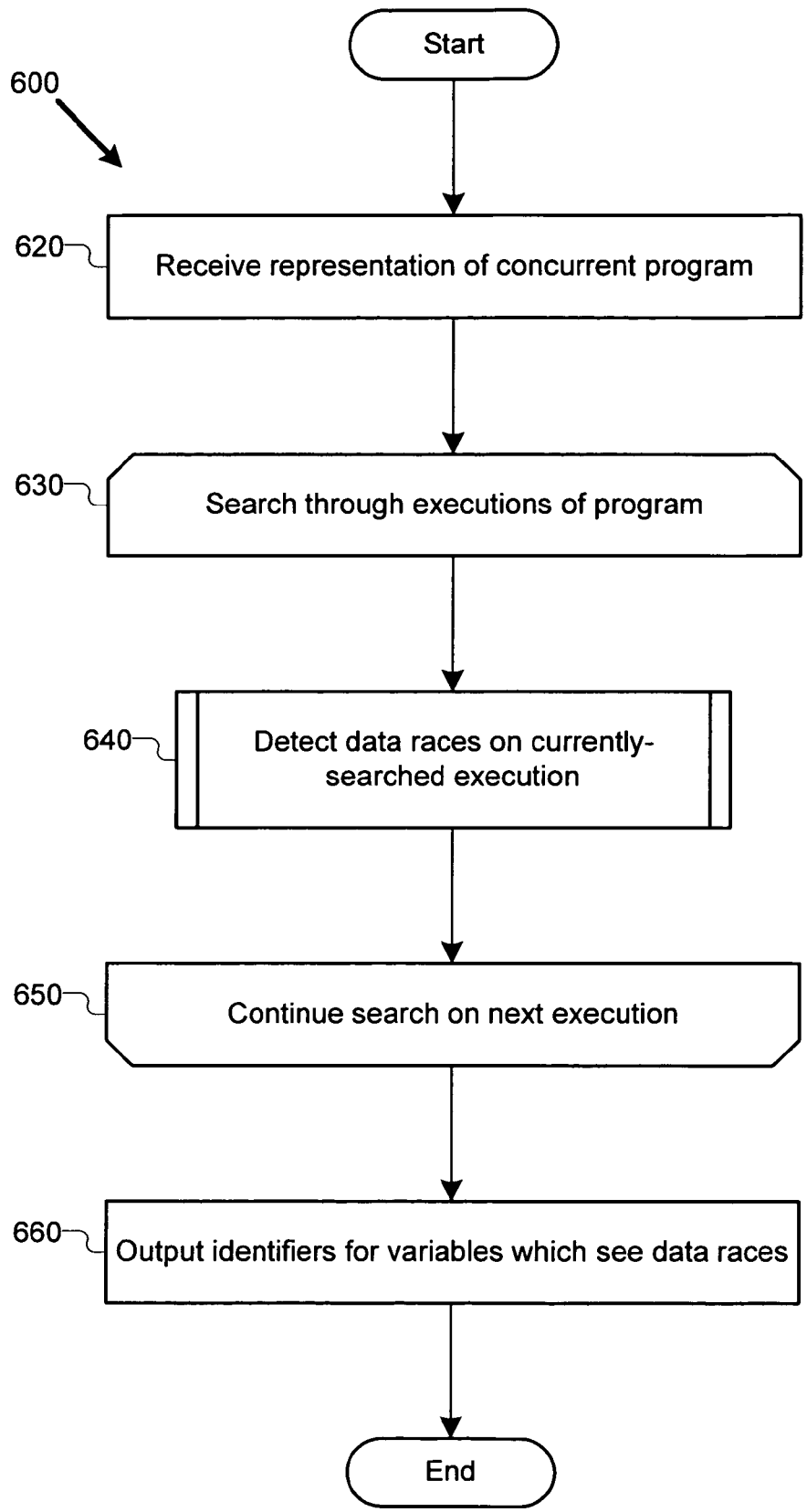
FIG. 6 is a flowchart illustrating an example process performed by the model checker of FIG. 4 for checking a program for data races and reporting data races in the program.

FIG. 6 is a flowchart of an example process 600 for searching a concurrent program for data races. In various implementations, the illustrated process blocks may be merged, divided into sub-blocks, or omitted. The process begins at block 620, where the model checker 400 receives a representation of the concurrent program to be analyzed. As discussed earlier, in various implementations different representations of the concurrent program may be received, one example being an instrumented executable version of the program. Next, at block 630, the model checker begins to loop for each execution of the program. Different implementations of the model may search through concurrent programs in different ways; one search implementation is illustrated below. The process then proceeds to block 640 where the data race detection module 450 acts on the execution currently being searched to detect data races. Examples of implementations of the process of block 640 are described below with respect to FIG. 7. The process then loops at block 650 for other executions of the program. Finally, at block 660, the model checker outputs identifiers for variables which the data race detecting module 450 identified as seeing data races. The process then ends.

Figure 7:
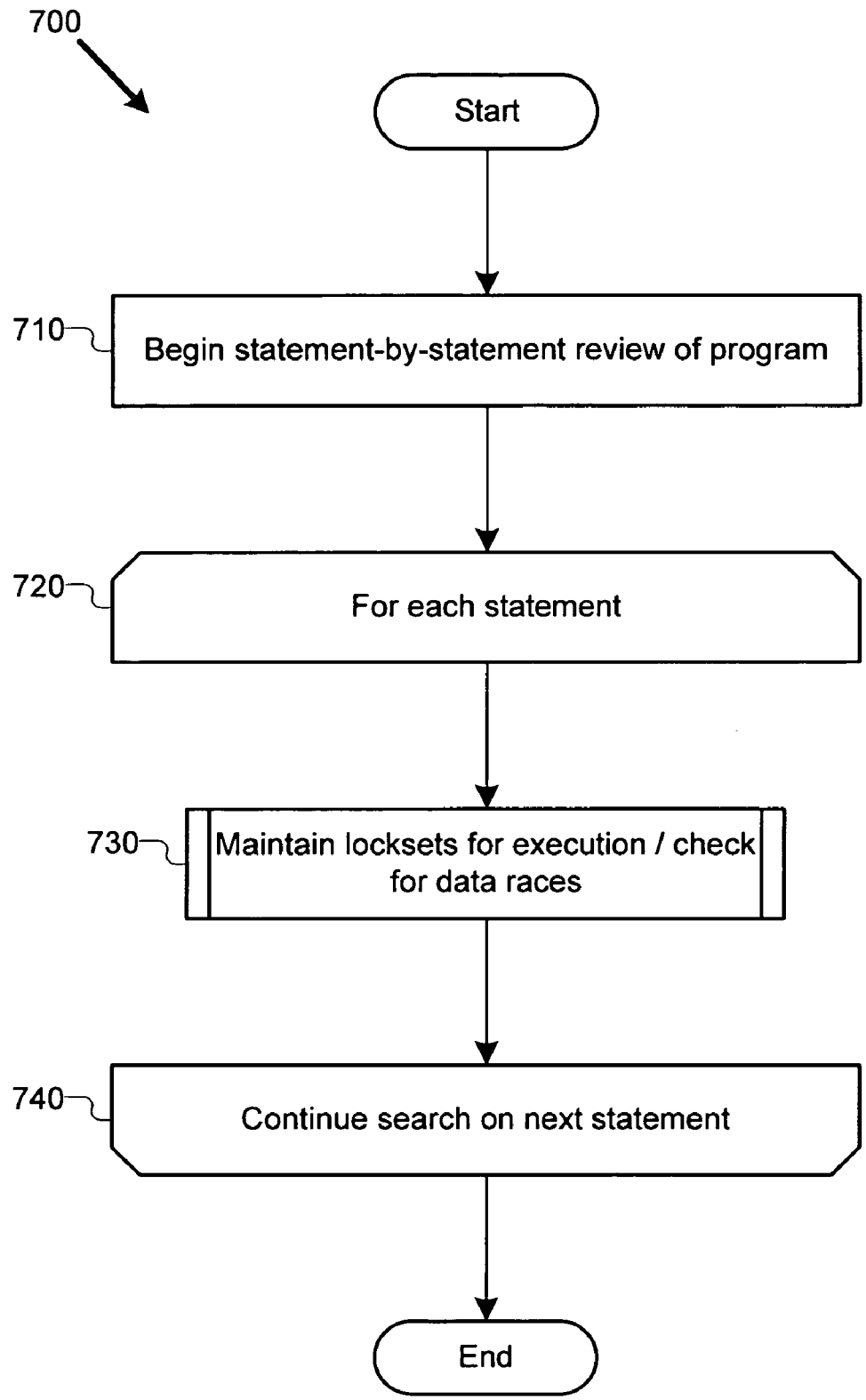
FIG. 7 is a flowchart illustrating a further example process performed by the model checker of FIG. 4 for checking a program for data races.

FIG. 7 is a flowchart of an example of a further process 700 performed by the data race detection module 450 for searching an execution of a concurrent program for data races. Process 700 corresponds to block 640 of FIG. 6. In various implementations, the illustrated process blocks may be merged, divided into sub-blocks, or omitted. Additionally, while in one implementation the data race detection techniques of FIG. 7 may be implemented inside a larger model-checking process, in other implementations, the data race detection techniques may be performed on a single execution for purposes other than model-checking. One such example of an application using the data race detection module 450 which is not a model checker is a background process run during execution of a program to determine if a data race has occurred during execution. In this example, if a data race is discovered, an exception is thrown either for the program to catch or to cause the program to abort. In this way, the application example is like a memory safety violation checker, such as the Java runtime uses to catch and avoid illegal memory accesses at runtime. Thus, the data race detection techniques described in FIG. 7 may be utilized outside of a model checker.

The process begins at block 710, where a statement-by-statement search of the currently-searched execution of the concurrent program is begun. Next, at block 720, a loop is begun which repeats for each statement searched. Inside this loop, at block 730, the data race detector module 450 maintains locks and checks for data races. The process of block 730 is described in greater detail below with respect to FIG. 8. Finally, at block, 740, the process loops for the next statement searched. When no more statements are searched, the process ends.

5. Examples of Lockset Maintenance and Data Race Detection Techniques

Formally, an implementation of the techniques described herein can be described as follows. Formally, the techniques can be described for an execution θ using two auxiliary functions, LH and LS. The function LH, from Tid to Powerset (Addr∪Tid) provides for each thread t the set of locks held by t. Apart from the locks present in the program, in one implementation each thread identifier t is also considered to be a lock that is held by the thread it identifies for the lifetime of the thread. Given a state (ls, h) and a thread t, LH is formally defined as $LH((ls,h),t) = \{t\} \cup \{a \in Addr | h(a, owner) = t\}$. However, in the examples below, LH(t) is often written when the state (ls,h) is clear from context. The function LS from Heap Variable to Powerset(Addr∪Tid) provides for each variable q that variables lockset LS(q) which contains the set of locks that potentially protect accesses to q. The techniques and rules described below update LS with the execution of each transition in σ. These updates to LS maintain the invariant that if thread t holds at least one lock in LS(q) at an access of q, then the previous access to q is related to this access by the happens-before relation.

In one implementation, maintenance of the locksets, as well as detection of data races can be described in terms of the following rules. Initially, LS(q)=Addr∪Tid for all q ∈ Heap Variable. Then, given as input a transition $$(ls, h) \xrightarrow{\alpha}_t (ls', h')$$

with ls(t)=⟨pc,l⟩ and ls'(t)=⟨pc',l'⟩, the following rules show how to update LS by a case analysis on α:

Rules for Lockset Maintenance

1. α = (x = new) or α = (x = op($y_1$,...,$y_m$)):
   LS is not updated.
2. α = (y = x.f) or α = (x.f = y):
   let lh = LH((ls,h),t) in
   LS = LS[(l(x),f) := lh]
3. α = acq(x):
   let lh = LH((ls',h'),t) in
   LS = λq ∈ HeapVariable.(lh ∩ LS(q) ≠ ∅)
        ? lh ∪ LS(q)
        : LS(q)
4. α = rel(x):
   LS is not updated.
5. α = (x = fork):
   let lh = LH((ls,h),t) in
   LS = λq ∈ HeapVariable.(lh ∩ LS(q) ≠ ∅)
        ? {l'(x)} ∪ LS(q)
        : LS(q)
6. α = join(x):
   let lh = LH((ls,h),l(x)), lh' = LH((ls,h),t) in
   LS = λq ∈ HeapVariable.(lh ∩ LS(q) ≠ ∅)
        ? lh' ∪ LS(q)
        : LS(q)

By this implementation, a race on the heap variable q=(l(x),f)) is reported in Rule 2 above if LS(q)∩LH((ls,h),t)=∅ just before the update. In one implementation, the computation of the function LH in any state requires a single scan of the heap. If that is too expensive, in another implementation, the function LH is computed incrementally as follows. LH is initialized as LH(t)={t} for all t ∈ Tid. Later, at an acquire operation by thread t, the data race detection module adds the lock being acquired to LH(t). At a release operation by thread t, the data race detection module removes the lock being released from LH(t).

One feature of these lockset-updating rules is that they rely only on synchronization primitives, namely fork, join, acquire, and release operations. Because the data race detection techniques operate on these instructions without making assumptions about a larger synchronization discipline, none of these assumptions are carried into the generations of the locksets. Besides avoiding the over-inclusive problems demonstrated in existing locket implementations like those of Section 1 above, the lack of assumptions about synchronization discipline also allows the techniques described herein to be implemented to detect data races on various concurrent programs regardless of their synchronization implementations.

Figure 8:
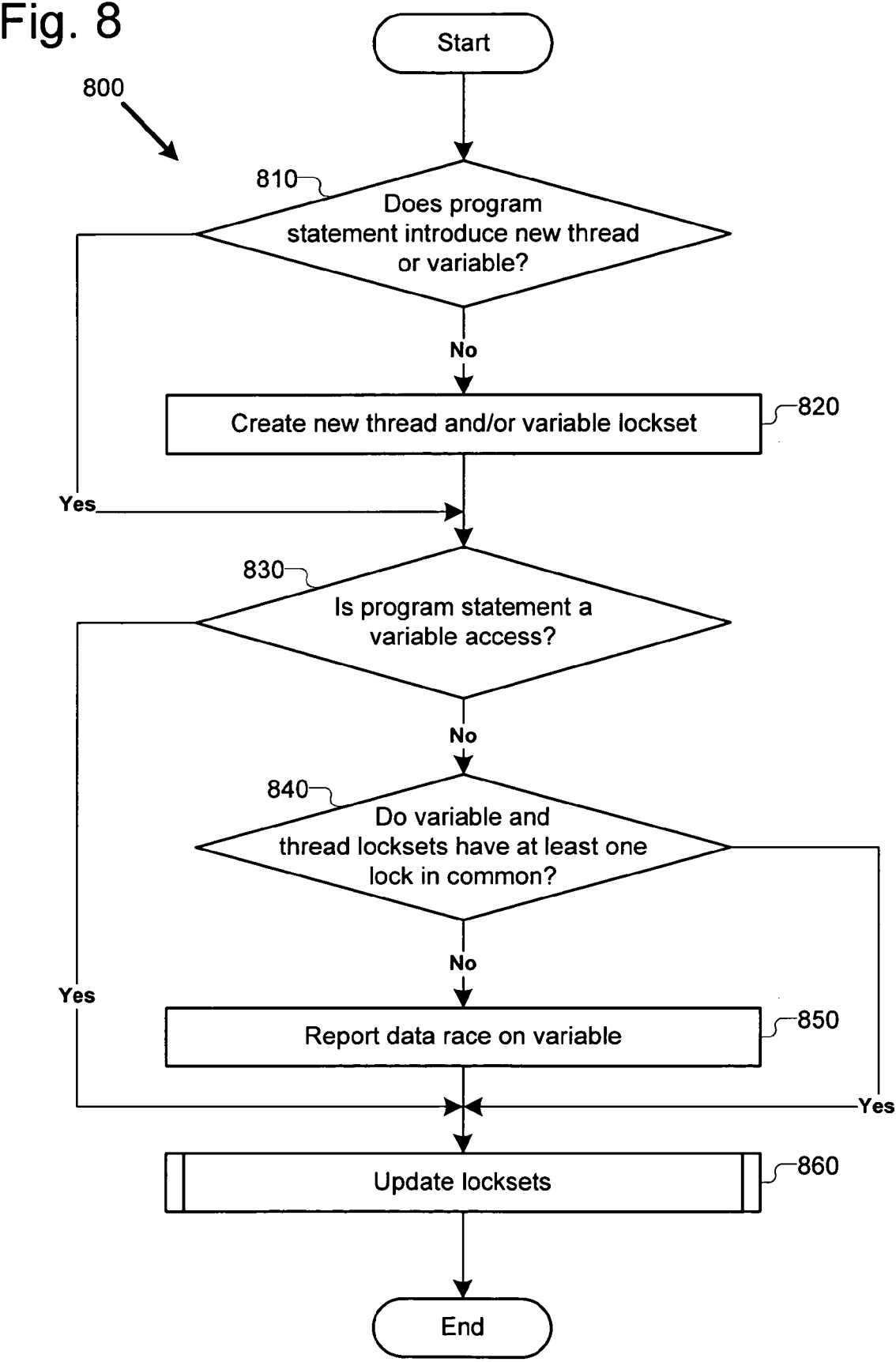
FIG. 8 is a flowchart illustrating an example process performed by the model checker compiler of FIG. 4 for identifying data races during checking and updating locksets.

FIGS. 8 and 9 illustrate one example of application of the rules illustrated above. FIG. 8 is a flowchart of an example of a further process 800 performed by the data race detection module 450 for maintaining locksets and detecting data races. In one implementation, procedure 800 is performed for each program statement as it is found in the search of process 700. Process 800 corresponds to block 730 of FIG. 7. In various implementations, the illustrated process blocks may be merged, divided into sub-blocks, or omitted. The process begins at decision block 810, where the data race detection module determines if the program statement introduces a new thread or variable. If a new thread or variable is introduced here, the process proceeds to block 820, where a new thread lockset or variable lockset is created for the new thread or new variable. As discussed above, if a new thread lockset is created, it is initialized for a new thread t as LH(t)={t}, while a new variable lockset for a variable q is initialized to LS(q)=Addr ∪Tid. In an alternative implementation, new thread locksets or variable locksets are created the beginning of the search or otherwise created before the thread or variables are created at program statements.

In either case of decision block 810, the process continues to decision block, 830 where the data race detection module 450 determines if the program statement is a variable access. If this is not the case, the program statement cannot exhibit a data race, and the process continues to block 860, where the existing locksets are updated according to the program statements. One example of the process of block 860 is described in greater detail below with respect to FIG. 9.

If, however, the data race detecting module determines that the statement is a variable access, then the data race detection module must check to see if the locksets maintained by the module indicate that a data race exists on the variable being accessed by the program statement. Thus, the process continues at decision block 840, where the data race detection module 450 determines if the variable lockset and thread lockset for the particular variable and thread involved in the variable access have at least one lock in common. This determination is equivalent to the determination in Rule 2 above of whether or not LS(q)∩LH((ls,h),t)=∅. If there are no elements in common between the two locksets, then at block 850, the data race detection module reports a data race on the variable. In various implementations, this report may include one or more of the following pieces of information: indications of the variable, the location of the memory access, and indications of the execution which led to the data race. The process then continues to block 860, where locksets are updated.

FIG. 9 is a flowchart of an example of a further process 900 performed by the data race detection module 450 for updating locksets based on the semantics of the searched program statement. In one implementation, procedure 900 is performed for each program statement as it is found in the search of process 700. Process 900 corresponds to block 860 of FIG. 8. In various implementations, the illustrated process blocks may be merged, divided into sub-blocks, or omitted.

As the rules listed above demonstrate, in one implementation the effects of the process of FIG. 9 are based on the type of transition that is demonstrated by the program statement searched in process 700. Process 900 thus begins at decision block 910, where the data race detection module determines if the program statement is a variable access. If so, at block 920 the data race detection module sets the lockset for the variable being accessed to equal the lockset for the current thread. In the formal language used above, this means that after update, LS(q)=LH(t). The process then ends.

If the program statement is not a memory access, then at decision block 930 the data race detection module determines if the statement is a release or an acquire of a lock. If the statement is either of these, at block 940 the data race detection module adds the lock to the thread lockset, in the case of an acquire, or removes the lock from the thread lockset in the case of a release.

Regardless of the outcome of decision block 930, the process then continues to decision block 950, where the data race detection module 450 determines if the statement was an acquire, a fork, or a join statement. If the statement is any one of these, then by the rules stated above at block 960 locks are added to potentially multiple variable locksets and the process ends.

FIG. 10 is a flowchart of an example of a further process 1000 performed by the data race detection module 450 for updating locksets based on the semantics of the searched program statement. Process 1000 corresponds to block 960 of FIG. 9. In various implementations, the illustrated process blocks may be merged, divided into sub-blocks, or omitted. The process begins at block 1010 where a loop is entered for every variable in the heap. Inside the loop, at decision block 1020 the data race detection module 450 then determines for the variable of the loop if there is at least one lock in common between the lockset for the variable and the lockset for the current thread. If not, then the process continues to block 1060 where the loop is repeated for the next variable on the loop.

If there is at least one lock in common, then at decision block 1030, the module determines what the type of transition the program statement involves. If the transition is an acquire or join, then at block, 1040 any locks from the lockset for the current thread which are not present in the lockset for the looped variable are added to the lockset for the looped variable. This is equivalent to setting the lockset LS to be the union of the locksets LS and LT. If, however the statement is a fork, then at block, 1050 the thread identifier for the new thread is added to the lockset for the variable. In either event, the process then loops for the next variable on the heap. When all variables have been analyzed, the process ends.

To present the intuition behind the techniques described herein, consider the evolution of LS(q) for a particular heap variable q starting from an access by thread t. According to Rule 2, this access sets LS(q) to LH(t). The other rules ensure that as the execution proceeds, the lockset LS(q) grows or remains the same, until the next access to q is performed by a thread t', at which point LS(q) is set to LH(t'). In other words, the invariant $LH(t) \subseteq LS(q)$ holds at the state after the access by t up to the state just before the next access by t'. Suppose t≠t'. If $LS(q) \cap LH(t') \neq \emptyset$ just before the second access, then an argument based on the invariant shows that the two accesses are related by the happens-before relation.

The techniques described herein also ensure the contrapositive of the above, that is, if the first access happens before the second access, then $LS(q) \cap LH(t') \neq \emptyset$. To illustrate how these techniques ensure the contrapositive, consider the following scenario. Suppose q=(o.f) and o is an object freshly allocated by t. Further, at the access of q by thread t no program locks were held so that LH(t)={t}. Later on, thread t makes this object visible by acquiring the lock of a shared object o' and assigning the reference o to a field in o'. After t releases the lock o', thread t' acquires it, gets a reference to o, releases the lock o', and accesses the variable (o,f). In this case, there is a happens before edge between the two accesses due to the release of o' by t and the acquire of o' by t'.

The data race detection techniques detect this happens-before edge by growing the lockset of q at each acquire operation. In Rule 3 for the acquire operation, the set lh of locks held by thread t after the acquire operation is added to the lockset LS(q) of any variable q if there is a common lock between lh and LS(q). As a consequence of this rule, when thread t acquires the lock o' in the example described above, the lock o' is added to LS(q), updating it to {t, o'}. Similarly, when thread t' acquires the lock o', the lockset LS(q) is updated to {t,o',t'} and thus $LS(q) \cap LH(t') \neq \emptyset$ at the access of q by t'. The rationale for growing the locksets at fork and join operations in Rules 5 and 6 respectively is similar.

6. Examples of Model Checking Implementations

FIGS. 11 and 12 illustrate pseudocode for an exemplary model checking implementation. The code listings of FIGS. 11 and 12 are used for illustrations purposes and should not be read to offer particular requirements or limitations on implementations of the techniques and systems described herein.

Code listing 1100 of FIG. 11 gives an example of the procedure Search and procedure code listing 1200 of FIG. 12 gives an example of the procedure Successor. The procedure Search performs a depth-first search ("DFS") of the state space using the stack variable declared on line 7. The DFS stack consists of a sequence of Node records, a code listing for which is found as code listing 1150 of FIG. 11. Each Node stores information associated with a state visited during the search. The state itself is stored in the field state. The search keeps track of the locksets for the heap variables in the field LS and executes the lockset algorithm along every execution generated by the search. The field la provides for each heap variable a reference to the node in the DFS stack from which the last access to that variable was performed. The fields Tid and done determine the scheduling of threads from the node. The field done contains the identifiers of those threads that have already been scheduled from the node.

To schedule an action α of thread t from a node curr at the top of the stack, the field curr.tid is set to t and the procedure Successor is invoked. This procedure returns the successor node next, which contains the new state and locksets. The value of curr.la is copied over to next.la, except if α accesses a variable q, in which case next.la(q) is updated to point to curr. In the procedure Search, the action α is optimistically treated as an independent action. As the search proceeds, the value of next.la(q) is copied to its successors on the stack. If a later action creates a data race on q with α, then a reference to curr is retrieved using la(q) and curr.tid is set to 0. When curr is again at the top of the stack, the procedure Search observes that curr.tid=0 and schedules other threads from curr. If, on the other hand, no race is discovered, then α is indeed an independent action and it is unnecessary to schedule other threads from curr.

The fields f, races, va, and succOnStack of Node, the variables table and rtable, lines 9-15, 25-32 and 38-52 of the procedure Search in the code listing 1100, and lines 21 and 27-34 of the procedure Successor in the code listing 1200 are used to implement state caching in the techniques described herein. Indeed, by omitting these lines Search becomes a stateless model checking algorithm which is sound but guaranteed to terminate only on finite acyclic state spaces. If these lines are included, then Search is a stateful model checking algorithm that is sound and guaranteed to terminate on all finite state spaces. These techniques significantly improve upon existing clock vector based technique by giving the ability to perform both stateless and stateful model checking. The characterization of the happens-before relation described above in terms of locksets is useful for this improvement. These techniques, by virtue of being stateful, provide a guarantee of termination and the possibility of avoiding redundant state exploration.

The variable table is a map from states to locksets and is used to store the states together with the corresponding locksets explored by the algorithm. The variable rtable maps a state to the set of heap variables on which a race may occur in some execution starting from that state. An entry corresponding to state s is added to table when it is pushed on the stack (lines 11 and 52 of code listing 1100). Conversely, an entry corresponding to state s is added to rtable when it is popped from the stack (line 30).

The implementation computes the canonical representatives of the initial state $(ls_1, h_1)$ and the initial locksets in lines 9-11 of code listing 1100. The canonical representatives capture symmetries in the state space due to the restricted operations allowed on the set Addr of heap addresses and the set Tid of thread identifiers. The canonical representatives are computed in two steps. First, the function Canonize is used to construct a canonizer f, a one-one onto function on Addr∪Tid. Then, the states and the locksets are transformed by an application of this function. The canonizer is stored in the f field of curr and an entry from the representative of the initial state to the representative of the initial lockset is added to table. There are known techniques for performing canonization.

The algorithm explores a transition on line 37 of code listing 1100 by calling the Successor procedure of code listing 1200. This function returns the next state in the node next. If a race is detected on line 19 due to an access to a heap variable q, then the tid field of the node from which the last access to q was made is set to 0. In addition, lines 27-34 of Successor in code listing 1200 check if the future races from the successor state have already been computed. If they have, then those races are used to set the tid field of other stack nodes to 0.

After generating the successor node next, the Search procedure stores the canonizer of next.state in next.f. If there is no entry corresponding to the canonical representative of next.state in table, then it adds a new entry and pushes next on the stack. The most crucial insight of the techniques appears in the case when an entry exists. In that case, the corresponding locksets are retrieved in the variable locksets. In line 43 of code listing 1100, the implementation checks whether locksets(q)⊆next.LS(q) for each heap variable q. If the check succeeds, then it is unnecessary to explore from next.state since any state reachable from next.state with locksets next.LS is also reachable from next.state with locksets and any race that happens from the state next.state with locksets next.LS also happens from next.state with locksets.

Lines 44-47 of code listing 1100 take care of a known problem with partial order techniques. By setting curr.tid to 0 in case next.state is on the stack, the implementation ensures that transitions of other threads get scheduled in the next iteration of the loop on lines 19-20. In this case, the field curr.succOnStack is also set to true. When a node is popped from the stack (line 24), if its tid field is 0 and succOnStack field is true (lines 25-29), then the implementation considers all races to be possible in the future and updates the tid fields of stack nodes appropriately.

Finally, if the subset check on line 43 of code listing 1100 fails, then the implementation updates next.LS to be the pointwise intersection of locksets and the old value of next.LS, updates table so it maps the canonical representative of next.state to the canonical representative of the new value of next.LS, and finally pushes next on the stack.

7. Examples of Extending the Data Race Detection Techniques for Concurrent Reads The lockset techniques described above do not distinguish between read and write accesses to a variable. To increase performance while still guaranteeing race-freedom, many programs rely on a locking discipline in which concurrent reads to a variable are allowed. This section, describes implementations which extend the lockset algorithm to allow for concurrent reads by treating reads and writes differently.

In the extended version, LS is divided into two separate maps: LSR and LSW. The function LSW from Heap Variable to Powerset(Addr∪Tid) is similar to the earlier LS and provides for each variable q the lockset LSW(q) containing the set of locks that protect write accesses to q. The function LSR from Heap Varaible×Tid to Powerset(Addr∪Tid) provides for each variable q and for each thread t the lockset LSR(q,t) containing the set of locks that protect read accesses to q by t.

One implementation of lockset update rules for the extended implementations are given as follows. Initially, LSW(q)=Addr∪Tid for all q ∈ HeapVariable. Additionally, initially LSR(q,u)=Addr∪Tid for all q ∈ HeapVariable and u ∈ Tid. Then, given as input a transition $$(ls, h) \xrightarrow{\alpha}_t (ls', h')$$

with ls(t)=⟨pc,l⟩ and ls'(t)=⟨pc',l'⟩, the following rules show how to update LS by a case analysis on α:

1. α = (x = new) or α = (x = op($y_1,...,y_m$)):
   LSW and LSR are not updated.
2. α = (y = x.f):
   LSW is not updated.
   let lh = LH((ls,h),t) in
   LSR = LSR[((l(x),f),t) := lh]
3. α = (x.f = y):
   let lh = LH((ls,h),t) in
   LSW = LSW[(l(x),f) := lh]
   LSR = LSR[(l(x),f) := λu ∈ Tid.lh]
4. α = acq(x):
   let lh = LH((ls',h'),t) in
   LSW = λq ∈ HeapVariable. (lh ∩ LSW(q) ≠ ∅)
                            ? lh ∪ LSW(q)
                            : LSW(q)
   LSR = λq ∈ HeapVariable. λu ∈ Tid. (lh ∩ LSR(q,u) ≠ ∅)
                            ? lh ∪ LSR(q,u)
                            : LSR(q,u)
5. α = rel(x):
   LSW and LSR are not updated.
6. α = (x = fork):
   let lh = LH((ls,h),t) in
   LSW = λq ∈ HeapVariable. (lh ∩ LSW(q) ≠ ∅)
                            ? {l'(x)} ∪ LSW(q)
                            : LSW(q)
   LSR = λq ∈ HeapVariable. λu ∈ Tid. (lh ∩ LSR(q,u) ≠ ∅)
                            ? {l'(x)} ∪ LSR(q,u)
                            : LSR(q,u)
7. α = join(x):
   let lh = LH((ls,h),l(x)), lh' = LH((ls,h),t) in
   LSW = λq ∈ HeapVariable. (lh ∩ LSW(q) ≠ ∅)
                            ? lh' ∩ LSW(q)
                            : LSW(q)
   LSR = λq ∈ HeapVariable. λu ∈ Tid. (lh ∩ LSR(q,u) ≠ ∅)
                            ? lh' ∪ LSR(q,u)
                            : LSR(q,u)

Initially, we have LSW(q)=Addr∪Tid for all q ∈ Heap Variable, and LSR(q,u)=Addr∪Tid for all q ∈ Heap Variable and for all u ∈ Tid. Given the maps LSW and LSR at state (ls,h), the rules above show how to compute the maps at state (ls',h') by a case analysis on α. Let q=(l(x),f) be a variable. If thread t performs a read access to q, Extended Rule 2 only updates LSR(q,t). But if thread t performs a write access to q, Rule 3 updates LSW(q) and LSR(q,u) for all u ∈ Tid. A race at a read access for q is reported in Rule 2 if LH(t)∩LSW(q)=∅ just before the access. A race at a write access for q is reported in Rule 3 if LH(t)∩LSR(q,u)=∅ for some u ∈ Tid.

8. Computing Environment

The above data race detection techniques can be performed on any of a variety of computing devices. The techniques can be implemented in hardware circuitry, as well as in software executing within a computer or other computing environment, such as shown in FIG. 13.

Figure 13:
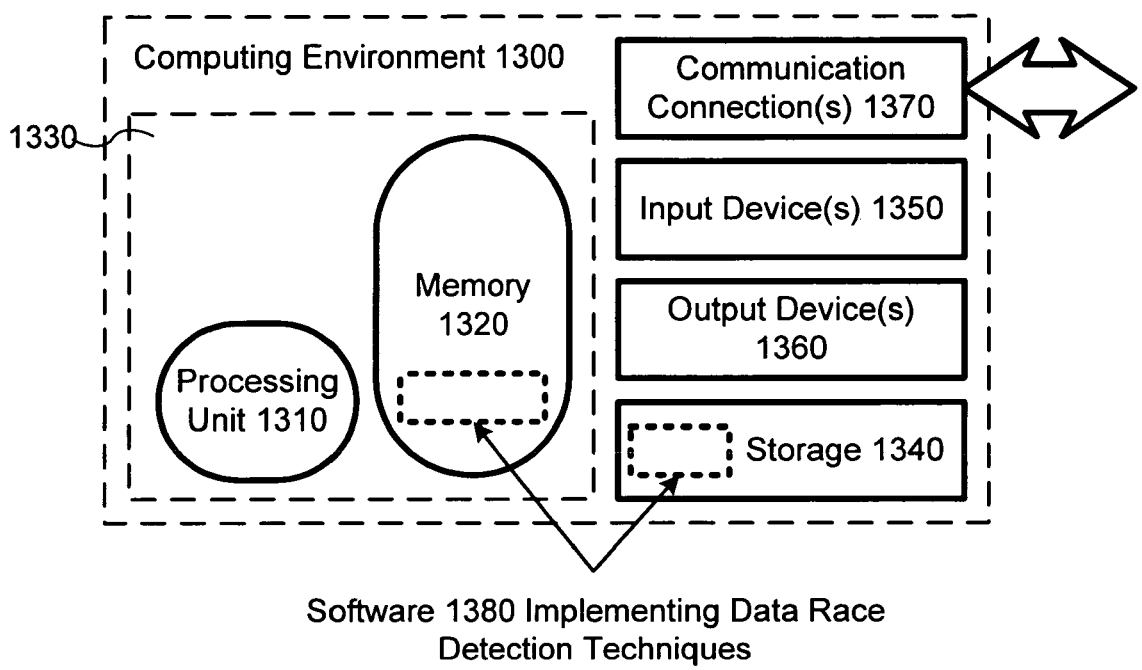
FIG. 13 is a block diagram illustrating an example computing environment for performing the data race detection techniques described herein.

FIG. 13 illustrates a generalized example of a suitable computing environment (1300) in which described embodiments may be implemented. The computing environment (1300) is not intended to suggest any limitation as to scope of use or functionality of the invention, as the present invention may be implemented in diverse general-purpose or special-purpose computing environments.

With reference to FIG. 13, the computing environment (1300) includes at least one processing unit (1310) and memory (1320). In FIG. 13, this most basic configuration (1330) is included within a dashed line. The processing unit (1310) executes computer-executable instructions and may be a real or a virtual processor. In a multi-processing system, multiple processing units execute computer-executable instructions to increase processing power. The memory (1320) may be volatile memory (e.g., registers, cache, RAM), non-volatile memory (e.g., ROM, EEPROM, flash memory, etc.), or some combination of the two. The memory (1320) stores software (1380) implementing the described techniques.

A computing environment may have additional features. For example, the computing environment (1300) includes storage (1340), one or more input devices (1350), one or more output devices (1360), and one or more communication connections (1370). An interconnection mechanism (not shown) such as a bus, controller, or network interconnects the components of the computing environment (1300). Typically, operating system software (not shown) provides an operating environment for other software executing in the computing environment (1300), and coordinates activities of the components of the computing environment (1300).

The storage (1340) may be removable or non-removable, and includes magnetic disks, magnetic tapes or cassettes, CD-ROMs, CD-RWs, DVDs, or any other medium which can be used to store information and which can be accessed within the computing environment (1300). The storage (1340) stores instructions for the software (1380) implementing the described techniques.

The input device(s) (1350) may be a touch input device such as a keyboard, mouse, pen, or trackball, a voice input device, a scanning device, or another device that provides input to the computing environment (1300). For audio, the input device(s) (1350) may be a sound card or similar device that accepts audio input in analog or digital form, or a CD-ROM reader that provides audio samples to the computing environment. The output device(s) (1360) may be a display, printer, speaker, CD-writer, or another device that provides output from the computing environment (1300).

The communication connection(s) (1370) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques described herein can be described in the general context of computer-readable media. Computer-readable media are any available media that can be accessed within a computing environment. By way of example, and not limitation, with the computing environment (1300), computer-readable media include memory (1320), storage (1340), communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "read," and "write" to describe computer operations in a computing environment. These terms are high-level abstractions for operations performed by a computer, and should not be confused with acts performed by a human being. The actual computer operations corresponding to these terms vary depending on implementation.

In view of the many possible variations of the subject matter described herein, we claim as our invention all such embodiments as may come within the scope of the following claims and equivalents thereto.

We claim:

1. A method for detecting one or more data races in a concurrent program, the method comprising performing by a computer the acts of:

generating locksets for an execution of the program;

wherein locksets comprise:

one or more thread locksets, each thread lockset representing locks owned by a thread in the execution;

and one or more variable locksets, each variable lockset representing locks which may provide protection for a variable in the execution; and wherein generating locksets for the execution comprises:

creating locksets for the execution;

and modifying content of the locksets according to program statements in the execution, wherein modifying the content of the locksets according to program statements comprises, for at least some program statements in a current thread which do not involve accesses to a variable, adding locks from a lockset of the current thread to the variable lockset;

and analyzing the generated locksets for the execution to determine a set of data race variables in the program, wherein, for each variable in the set of data race variables, the execution of the program involves a data race on the variable.

2. The method of claim 1, wherein, for every variable involved in a data race in the execution of the program, the set of data race variables comprises the variable.

3. The method of claim 1, wherein in a case that the program statement in a current thread which does not involve accesses to a variable is a statement to acquire a lock, then said modifying the content of the locksets according to program statements comprises:

adding the lock to a thread lockset for the current thread; and for each variable in the execution, when there is at least one lock in common between the variable lockset for the variable and the lockset for the current thread, adding every lock in the thread lockset for the current thread to the variable lockset.

4. The method of claim 1, wherein in a case that the program statement in a current thread which does not involve accesses to a variable is a statement to release a lock, then said modifying variable locksets based on the program statement comprises removing the lock from a thread lockset for the current thread.

5. The method of claim 1, wherein in a case that the program statement in a current thread which does not involve accesses to a variable is a statement to fork a new thread, then said modifying the content of the locksets according to program statements comprises:
creating a new thread lockset for the new thread; and
for each variable in the execution, when there is at least one lock in common between the variable lockset for the variable and the lockset for the current thread, adding the new thread as a lock in the variable lockset.

6. The method of claim 1, wherein in a case that the program statement in a current thread which does not involve accesses to a variable is a statement to join a thread to the current thread, then said modifying the content of the locksets according to program statements comprises, for each variable in the execution, when there is at least one lock in common between the variable lockset for the variable and the lockset for the thread which is to be joined, adding every lock in the thread lockset for the thread to be joined to the variable lockset.

7. The method of claim 1, wherein analyzing the generated locksets for the execution comprises, when a program statement in the execution is a data access on an accessed variable:
determining if there is a lock in common between a thread lockset for the current thread and a variable lockset for the accessed variable;
when there is no lock in common, determining that there is a data race on the variable for the execution; and
when there is at least one lock in common, modifying the variable lockset to contain the locks which were contained in the thread lockset at the time of the data access.

8. The method of claim 7, wherein:
the one or more variable locksets comprise, for each variable in the execution:
a read variable lockset representing locks which may provide read access protection for a variable in the execution; and
a write variable lockset representing locks which may provide write access protection for a variable in the execution; and
wherein analyzing the generated locksets for the execution comprises, when a program statement in the execution is a write access on an accessed variable:
determining if there is a lock in common between a thread lockset for the current thread and a write variable lockset for the accessed variable; and
when there is no lock in common, determining that there is a data race on the variable for the execution.

9. The method of claim 8, wherein analyzing the generated locksets for the execution comprises, when a program statement in the execution is a read accesses on an accessed variable, ignoring whether there may be a data race on the variable.

10. The method of claim 1, further comprising:
searching through one or more executions of the program;
repeating generating locksets and analyzing the generated locksets for each searched execution to determine data race variables for the searched execution; and
including the one or more determined data race variables for the searched execution in the set of data race variables.

11. The method of claim 2, wherein the method operates without assumptions about any particular synchronization mechanism used in the execution.

12. A computer system for checking a model of a program, the program utilizing multiple threads, the computer system comprising:
a memory storing a data race detection module; and
a processing unit for running the data race detection module, wherein said data race detection module is configured to:
perform a search of executions of the program; and
for each execution searched:
generate locksets for threads and references in the execution by adding locks to locksets for references based on non-access operations in the program, the locksets configured to comprise information which precisely demonstrates data races, wherein locksets comprise one or more thread locksets, each thread lockset representing locks owned by a thread in the execution and one or more variable locksets, each variable lockset representing locks which may provide protection for a variable in the execution, and wherein generating locksets for threads and references in the execution comprises creating locksets for the execution and modifying content of the locksets according to program statements in the execution, wherein modifying the content of the locksets according to program statements comprises, for at least some program statements in a current thread which do not involve accesses to a variable, adding locks from a lockset of the current thread to the one or more variable locksets;
analyze the locksets generated for the execution to determine if a data race must exist on a reference in the execution;
when a data race exists for a reference, record that a data race exists for the reference.

13. The system of claim 12, wherein:
the data race detection module is configured to analyze the locksets by:
determining, for each reference access, which, if any, references contained in the lockset for a thread containing the reference access are contained in the lockset for the reference; and
when no member of the lockset for the reference is contained in the lockset for a thread containing the reference access, determining that there is a data race on the reference.

14. The system of claim 13, wherein:
locksets for references in the execution comprise locksets for reference writes and locksets for reference reads; and
determining, for each reference access, which, if any, references contained in the lockset for a thread containing the reference access are contained in the lockset for the reference comprises determining, for each reference write, which, if any, references contained in the lockset for the thread containing the reference access are contained in the lockset for reference writes for the reference.

15. One or more computer-readable storage media containing instructions which, when executed by a computer, cause the computer to perform a method for identifying data races on an execution of a concurrent program, the method comprising:

maintaining a set of locksets for threads and variables used in the execution, the locksets comprising information sufficient to allow a precise data race analysis on the execution, wherein said maintaining a set of locksets for threads and variables used in the execution comprises adding locks from locksets for threads to locksets for variables based on semantics of program statements in the execution;

wherein locksets comprise:

one or more thread locksets, each thread lockset representing locks owned by a thread in the execution;

and one or more variable locksets, each variable lockset representing locks which may provide protection for a variable in the execution; and wherein maintaining the set of locksets for threads and variables used in the execution comprises:

creating locksets for the execution;

and modifying content of the locksets according to program statements in the execution, wherein modifying the content of the locksets according to program statements comprises, for at least some program statements in a current thread which do not involve accesses to a variable, adding locks from a lockset of the current thread to the one or more variable locksets; and analyzing the set of locksets to determine which variables see a data race during the execution.

16. The computer-readable media of claim 15, wherein:

analyzing the set of locksets comprises:

at program statement in a thread, the program statement indicating a write to a variable, determining if any locks held in a lockset maintained for the thread in the execution are held in common with a lockset maintained for the variable in the execution; and if no locks are held in common, determining that the variable being written to in the program statement sees a data race.

17. The computer-readable media of claim 15, wherein the method further comprises:

nondeterministically searching through executions of the program; and repeating maintaining a set of locksets and analyzing the set of locksets for each searched execution.

* * * * *

UNITED STATES PATENT AND TRADEMARK OFFICE
CERTIFICATE OF CORRECTION

| | |
|---|---|
| PATENT NO. | : 7,752,605 B2 |
| APPLICATION NO. | : 11/403414 |
| DATED | : July 6, 2010 |
| INVENTOR(S) | : Shaz Qadeer et al. |

It is certified that error appears in the above-identified patent and that said Letters Patent is hereby corrected as shown below:

In column 9, line 27, delete "oft" and insert -- of t --, therefor.

Signed and Sealed this
Eighth Day of February, 2011

David J. Kappos
*Director of the United States Patent and Trademark Office*